Feb. 5, 1946.  R. R. KILIAN  2,394,074
STARTING VALVE FOR RECIPROCATING MOTORS
Filed Jan. 12, 1945   2 Sheets-Sheet 1
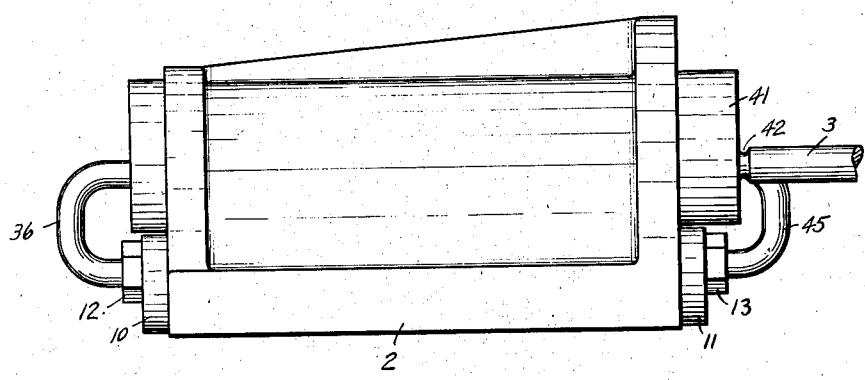
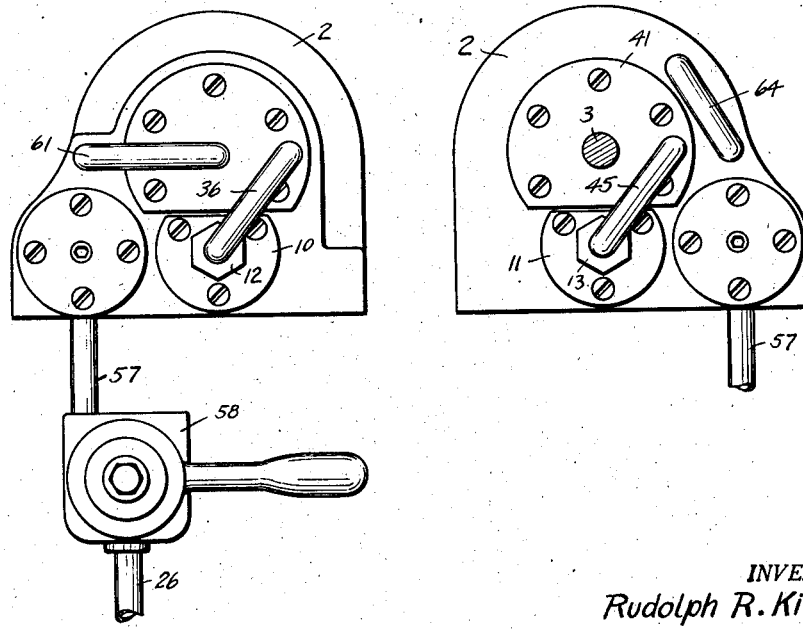
INVENTOR:
Rudolph R. Kilian,
BY
Bodell & Thompson
ATTORNEYS.

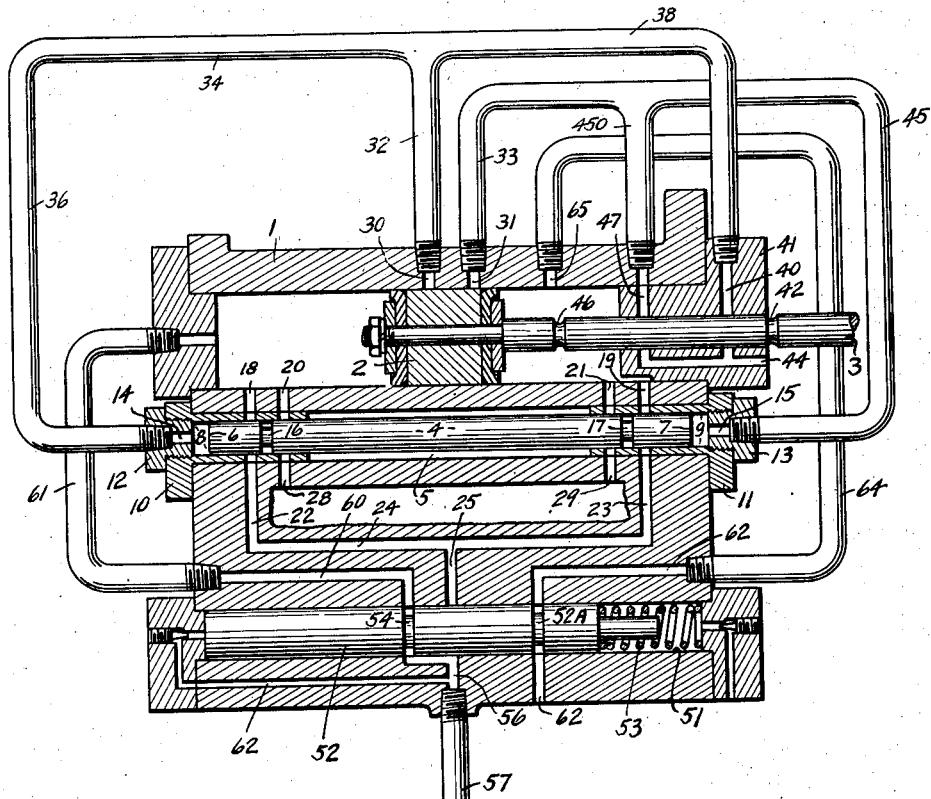
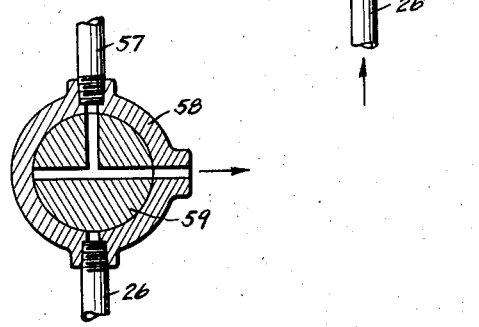

Patented Feb. 5, 1946

2,394,074

UNITED STATES PATENT OFFICE 2,394,074

STARTING VALVE FOR RECIPROCATING MOTORS

Rudolph R. Kilian, Baldwinsville, N. Y., assignor to Lipe-Rollway Corporation, Syracuse, N. Y., a corporation of New York Application January 12, 1945, Serial No. 572,534

2 Claims. (Cl. 121—130)

This invention relates to reciprocating engines or motors utilizing a pressure fluid, as air or steam, preferably air. It has for its object an automatic valve operable to start the motor by motive fluid by-passed around the reversing valve upon the operation of a manual control valve in the feed line for the motive fluid, whereby the engine is started by the opening of the control valve if the engine has stopped in "stall" position or the reversing valve is out of its proper synchronism and the synchronism of the reversing valve restored.

The invention consists in the novel features and in the combinations and constructions hereinafter set forth and claimed.

In describing this invention, reference is had to the accompanying drawings, in which like characters designate corresponding parts in all the views.

Figure 1 is a longitudinal side elevation of a motor embodying this invention.

Figures 2 and 3 are end elevations looking to the right and left respectively in Figure 1.

Figure 4 is a longitudinal sectional view of the motor with starting valve embodied therein and the control valve, the latter being shown in open position.

Figure 5 is a transverse sectional view through the manual control valve showing it as shifted into "stop" position.

The motor here illustrated comprises a cylinder, a double acting piston in the cylinder and a reversing valve for controlling the flow of motive fluid alternately to the cylinder on opposite sides of the piston and the exhaust of motive fluid therefrom with said reversing valve operated by motive fluid instead of mechanically, which motive fluid passes from the cylinder on opposite sides of the piston to pressure operated devices for operating the reversing valve in opposite directions, the flow of motive fluid from the cylinder to the actuating devices for the reversing valve being timed by the piston during its travel, or in other words, the position of the piston determines to which of the pressure operated devices the motive fluid flows. The release of the motive fluid from the pressure device is also controlled and timed by the piston.

The engine here illustrated is designed to use air as a motive fluid.

1 designates the cylinder and 2 the piston in the cylinder, this having its rod 3 extending axially through one end or head of the cylinder. The rod 3 may be connected to a crank shaft in the usual manner or to the movable member of a pump, as a vacuum pump, and when connected to the pump, it is connected directly to the piston rod of the pump. The piston is shown as single with pressure faces on opposite ends thereof.

4 designates the reversing valve, this being here shown as a slide valve or rod mountable in a suitable bore 5 in the body or casting of the cylinder parallel to the axis of the cylinder, the valve rod having pressure faces 6 and 7 at its opposite ends presented in pressure chambers 8 and 9 respectively of the pressure operated devices. The chambers 8 and 9 are here shown as formed in tubular members or bushings 10 and 11 fitted into the ends of the bore 5, the outer ends of these tubular members or bushings 10, 11 being closed by plugs or glands 12, 13 having axial ports or passages 14 and 15 therein for the intake and exhaust of the motive fluid. The valve rod 4 is provided with ports, as circumferential grooves 16 and 17, the port 16 communicating alternately with the intake port 18 and exhaust port 20 of one end, as the left hand end, of the cylinder 1 and the port or groove 17 communicating alternately with the intake port 19 and exhaust port 21 of the other or right hand end of the cylinder 1. The groove or port 16 communicates with its inlet port 18, when the groove or port 17 communicates with the exhaust port 21. The cylinder is also provided with ports 22 and 23 paired with the ports 18 and 19, respectively, and which communicate through suitable branch conduits 24, 25 with a feed line 26 through a control or starting and stopping valve. Also, the cylinder body around the valve 4 is formed with exhaust ports 28 and 29 paired with the exhaust ports 20 and 21. The ports 18—20 and 22—28 and the ports 19—21 and 23—29 also open through the tubular members 10 and 11 in order to register with the ports or grooves 16, 17 of the valve rod.

The cylinder is formed with ports 30 and 31 arranged to be uncovered by the piston 2 when at the end of its power stroke to the right and when at the end of its power stroke to the left respectively, so that when the port 30 is uncovered, air under pressure passes from the cylinder through the port 30 and conduits 32, 34 and 36 to the plug or coupling 12 or the passage 14 thereof to the pressure chamber 8 to shift the reversing valve 4 to the right. The conduit 34 is also connected by a pipe 38 to a port 40 in a packing or bushing 41 fitted into one end, as the right hand end of the cylinder, which port 40 comes in line with a port 42, as a circumferential groove in the piston rod 3 when the piston 2 is at the start of its power stroke from left to right, to exhaust the air from the chamber 8. The port or groove 42 communicates with exhaust ports 40, 44 communicating through openings or ports in the stuffing box or tubular member 41 around the piston rod 3. When the piston reaches the end of its power stroke to the right and uncovers the port 30, the reversing valve 4 is operated to the right to close the intake port 18 and open the exhaust port 20, and open the intake port 19 and close the exhaust port 21 for the right end of the cylinder 1. The port 31 is uncovered by the piston 2, when the piston is at the end of its power stroke to the left. When so uncovered, air passes from the right end of the cylinder through port 31, conduits 33, 45 to the pressure chamber 9 through port 15, and shifts the reversing valve 4 to the left, closing the inlet port 19 at the right end of the cylinder 1 to the inlet of air and opening the exhaust port 21 and also opening the inlet port 18 at the left end of the cylinder and closing the exhaust port 20. The movement of the piston on its power stroke to the right brings the port or groove 46 in the piston rod into register with the exhaust port 47, when the piston 2 approaches or reaches the end of its power stroke to the right, permitting the air to exhaust from the chamber 9 through port 15, conduits 45, 450 and ports 47, 44, and hence permit the valve 4 to reverse from left to right under the air coming into the chamber 8, as before described. When the piston approaches or reaches the end of the power stroke to the left and uncovers the port 31, air passes through the port 31, conduits 33, 45, to the pressure chamber 9 and reverses the valve 4 to the left when the port or groove 42 in the piston rod 3 again registers with the port 40 and opens the chamber 8 to the exhaust of air through conduits 36, 34, 38, ports 40, 42 and 44. Thus, during repeated operations, the reversing valve is operated or reversed by air pressure taken from one end or the other of the cylinder, and mechanical connections are avoided. Most of the pipes shown diagrammatically in Figure 4 are actually bores in the cylinder block 1. The passages 36, 45 leading to pressure chambers 8, 9 are for convenience called kick passages.

The invention consists in a starting valve member which in normal position operates to pass motive fluid or air to one end only of the cylinder, when the control valve in the feed line is operated to open position, the starting valve also opening an exhaust passage from the other end of the cylinder. When the engine is thus once started through the by-pass, the reversing valve is rectified in case it has stopped in "stall" position. The starting valve is normally pressed, as by a spring, into position to open the by-pass to one end only of the cylinder and open the exhaust passage from the other end of the cylinder, and is moved out of this normal position, when the control valve in the feed line is opened, by pressure, against the control valve member through the by-pass from the feed line.

The starting valve is preferably a unit with the cylinder block, and as here shown, includes a bore 51 formed in the cylinder block, and a shiftable valve member 52, this being a reciprocating rod slidable in the bore 51 and normally pressed in one direction, as by a spring 53. The valve rod 52 is formed with a port or groove 54, which normally registers with a wide transfer passage 55 in the wall of the bore 51, which passage 55 communicates with a duct 56 connected in the feed line or a pipe 57 therein, in which is mounted a two-way control valve 58 including a manually operable member 59. The port 54 also communicates through a duct 60 formed in the block or body of the motor and through a pipe 61 with one end, as the left end, of the cylinder 1. The duct 60 and the pipe 61 provide a by-pass around the reversing valve, which by-pass is open when the starting valve is in normal starting position. The valve rod 52 is a piston and one end of the bore 51, as the left end thereof, is a pressure chamber, which communicates through a duct or by-pass 62 formed in the block with the duct 56. Thus, when the manual valve 58 is open to the flow of air or the valve member 59 in the position shown in Figure 4, air will pass to the transfer chamber 55, port 52, duct 60 and pipe 61 to the left end of the cylinder 1 and actuate the piston to the right, and while this is occurring, air will pass also through the smaller duct 62 to the left end of the bore 51 of the starting valve and press the valve member 52 to the right against the action of the spring 53, thus bringing the port 54 of the valve rod 52 into register with the ducts 22, 23 which are the ends of branches of a duct 24. The port 54, while in register with the duct 24, remains in register with the transfer passage 55. While the piston 2 is being actuated to the right, by air passing through the duct 60 and pipe 61 and finally uncovers the port 30, air will then pass through the passages 34, 35, 36 to the pressure chamber 8 and shift the reversing valve into proper position or synchronism with the piston, if it has stopped short of proper position, when the engine stopped. Thereafter, the engine will run normally with the reversing valve being operated through the kick passages 34, 35, 36 and 33 and 45. When the engine is running regularly, the starting valve rod 52 is held in its shifted position, wherein the spring 51 is compressed, by the air pressure through the duct 62. When the valve member 59 returns to exhaust position, as seen in Figure 5, the duct 62 is open to the exhaust of air from the pressure chamber of the starting valve, so that the spring 53 re-acts and the port 52A of the valve rod 52 is brought into register with the exhaust duct 62, which communicates with the pipe 64 leading from a port 65 in the cylinder 1.

Owing to this starting valve, all the operator does to start the engine is to turn the control valve "on," no skill being required to initiate the starting of the engine, even when the piston or the reversing valve is in "stall" position.

What I claim is:

1. A starting valve for double acting reciprocating motors which include a cylinder and a piston therein, a reversing valve for controlling the flow of motive fluid alternately to and from the cylinder on opposite sides of the piston, operated by motive fluid from the cylinder through kick passages, a power feed line, and a manual control valve in the feed line; said starting valve being pressure operated and including a pressure chamber and a member therein shiftable from normal position into position to open the feed line when the control valve is operated to open position, means normally urging the starting valve member to normal position, a by-pass for the motive fluid communicating with the feed line and with the pressure chamber of the starting valve, so that the pressure therein shifts the starting valve from normal to starting position against the action of said means and holds the starting valve member in said position as long as the control valve is open, a by-pass including a duct leading to one end of the cylinder only, the starting valve having a port normally opening said duct and operable to close said duct when the starting valve member is operated by the pressure in its pressure chamber, an exhaust duct leading from the other end of the cylinder, the starting valve member having a port opening the exhaust duct when the starting valve is in normal position and closing the same when the starting valve is in shifted position.

2. A starting valve for double acting reciprocating motors which include a cylinder and a piston therein, a reversing valve for controlling the flow of motive fluid alternately to and from the cylinder on opposite sides of the piston, operated by motive fluid from the cylinder through kick passages, a power feed line, and a manual control valve in the feed line; said starting valve being pressure operated and including a passage, and a movable valve member slidable in the passage, one end of the passage being a pressure chamber, the valve member being slidable from normal position into position to open the feed line when the control valve is operated to open position, a spring normally urging the starting valve member to normal position, a by-pass from the feed line communicating with the pressure chamber of the starting valve and arranged so that the pressure therein shifts the valve against said spring, and a duct leading to one end of the cylinder only, the starting valve having a port normally opening said duct and operable to close the same when the starting valve is operated by the pressure in the pressure chamber, and an exhaust duct leading from the other end of the cylinder, the starting valve having a port opening the exhaust duct when the starting valve is in normal position and closing the same when in shifted position.

RUDOLPH R. KILIAN.